United States Patent
Connally et al.

(10) Patent No.: US 7,519,887 B2
(45) Date of Patent: *Apr. 14, 2009

(54) APPARATUS FOR STORING AND FORMATTING DATA

(75) Inventors: Carli Connally, Fort Collins, CO (US); Reid Hayhow, La Porte, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 453 days.

This patent is subject to a terminal disclaimer.

(21) Appl. No.: 11/345,040

(22) Filed: Jan. 31, 2006

(65) Prior Publication Data

US 2007/0180146 A1 Aug. 2, 2007

(51) Int. Cl.
*G01R 31/28* (2006.01)
*G01D 3/00* (2006.01)

(52) U.S. Cl. ...................... 714/733; 702/108
(58) Field of Classification Search ............... 714/701, 714/702, 724, 48, 763, 772, 799; 702/108
See application file for complete search history.

(56) References Cited

U.S. PATENT DOCUMENTS

2002/0178185 A1* 11/2002 Kuchinsky et al. .......... 707/512
2007/0179732 A1* 8/2007 Kolman et al. .............. 702/118
2007/0179755 A1* 8/2007 Connally et al. ............ 702/189
2007/0179970 A1* 8/2007 Connally et al. ........ 707/103 R
2007/0180321 A1* 8/2007 Connally et al. .............. 714/33
2007/0192346 A1* 8/2007 Connally et al. ............ 707/101

* cited by examiner

*Primary Examiner*—Phung M Chung
(74) *Attorney, Agent, or Firm*—Holland & Hart, LLP

(57) ABSTRACT

In one embodiment, apparatus includes a data populator that is provided to 1) receive a plurality of events, 2) create a plurality of data objects in memory, with at least some of the data objects corresponding to logical groupings of data implied by ones of the events, 3) relate data corresponding to ones of the events to ones of the data objects, and 4) store the data in the memory. A number of data formatters 1) accesses ones of the data objects, and 2) retrieves and format the data that is related to the data objects, the data being retrieved in response to notifications received by the data formatter(s). A notification manager receives indications of events from the data populator, and provides notifications of ones of the events to one or more of the data formatters. Other embodiments are also disclosed.

15 Claims, 6 Drawing Sheets

| Line | Event Logged | Data |
|---|---|---|
| 1 | Start Lot Level | |
| 2 |     Variable Assignment | Lot_id=1 |
| 3 |     Start Device Level | |
| 4 |         Variable Assignment | Device_id=a |
| 5 |         Device tested | <test results for device "a"> |
| 6 |         Variable Assignment | Device_id=b |
| 7 |         Device tested | <test results for device "b"> |
| 8 |         Variable Assignment | Device_id=c |
| 9 |         Device tested | <test results for device "c"> |
| 10 |     End Device Level | |
| 11 | End Lot Level | |
| 1 | Start Lot Level | |
| 2 |     Variable Assignment | Lot_id=2 |
| 3 |     Start Device Level | |
| 4 |         Variable Assignment | Device_id=d |
| 5 |         Device tested | <test results for device "d"> |
| 6 |         Variable Assignment | Device_id=e |
| 7 |         Device tested | <test results for device "e"> |
| 8 |         Variable Assignment | Device_id=f |
| 9 |         Device tested | <test results for device "f"> |
| 10 |     End Device Level | |
| 11 | End Lot Level | |

FIG. 4

APPARATUS FOR STORING AND FORMATTING DATA

BACKGROUND

It is sometimes necessary to format an electronic data set in different ways. One way to format a data set in different ways is by means of a plurality of data formatters, each of which is configured to format the data set in a different way, and each of which accesses the data set in series (i.e., when one of the data formatters is done formatting the data, another of the data formatters then accesses the data). Alternately, each of the data formatters may access the data set in parallel. Or, the data set can be replicated, and each of the data formatters can access a different replica of the data set.

When a plurality of data formatters access a data set in series, it takes longer to format the data set than if the data formatters access the data set in parallel. However, when data formatters access a data set in parallel (or access replicas of the data set in parallel), memory, storage and/or processing resources are often used inefficiently, and memory, storage and/or processing limitations can be neared or reached.

SUMMARY OF THE INVENTION

In one embodiment, apparatus comprises a data populator, a number of data formatters, and a notification manager. The data populator is provided to 1) receive a plurality of events, 2) create a plurality of data objects in memory, with at least some of the data objects corresponding to logical groupings of data implied by ones of the events, 3) relate data corresponding to ones of the events to ones of the data objects, and 4) store the data in the memory. The number of data formatters is provided to 1) access ones of the data objects, and 2) retrieve and format the data that is related to the data objects, the data being retrieved in response to notifications received by the data formatter(s). The notification manager is provided to receive indications of events from the data populator, and to provide notifications of ones of the events to one or more of the data formatters.

In another embodiment, apparatus for formatting test results also comprises a data populator, a number of data formatters, and a notification manager. The data populator is provided to 1) receive an ordered sequence of events corresponding to execution of a plurality of tests on at least one device under test (DUT), 2) create a plurality of data objects, with at least some of the data objects corresponding to logical groupings of test results implied by ones of the events, 3) relate ones of the data objects to others of the data objects in a hierarchical tree structure; and 4) store data corresponding to ones of the events in the hierarchical tree structure. The data includes test results. The number of data formatters is provided to retrieve and format test results stored in the hierarchical tree structure, the test results being retrieved in response to notifications received by the data formatter(s). The notification manager is provided to receive indications of events from the data populator, and to provide notifications of ones of the events to one or more of the data formatters.

Other embodiments are also disclosed.

BRIEF DESCRIPTION OF THE DRAWINGS

Illustrative embodiments of the invention are illustrated in the drawings, in which:

FIG. 4 illustrates exemplary contents of an EDL file used by the system shown in FIG. 3;

DETAILED DESCRIPTION

Figure 1:
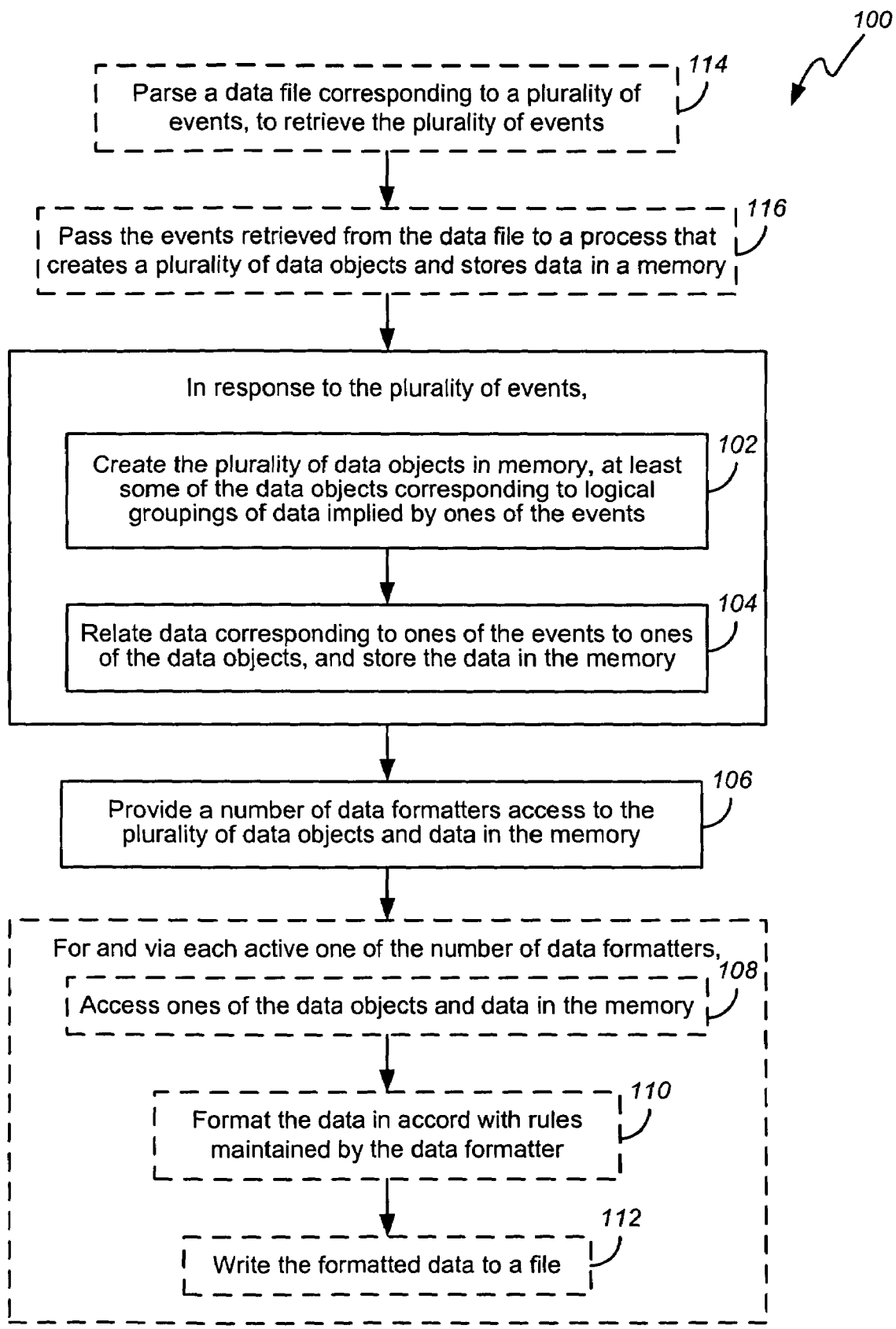
FIG. 1 illustrates an exemplary method for storing and formatting data.

As a preliminary manner, it is noted that, in the following description, like reference numbers appearing in different drawing figures refer to like elements/features. Often, therefore, like elements/features that appear in different drawing figures will not be described in detail with respect to each of the drawing figures.

To improve the manner in which data is formatted by a plurality of data formatters, FIG. 1 illustrates an exemplary method 100 for storing data that is to be accessed by the plurality of data formatters. The method 100 proceeds as follows. In response to a plurality of events, a plurality of data objects are created in memory at step 102. By way of example, and in the realm of circuit test, the events might comprise events to signal the loading or unloading of a new wafer, events to signal the start or end of testing for a particular device on the wafer, and evens to signal the starts and ends of different tests and subtests.

At least some of the data objects created by the method 100 correspond to logical groupings of data that are implied by ones of the events (e.g., a wafer object, a device object, and so on). As used in this description, "implied" groupings can be those that are specifically mentioned, or those that are only inferred. In any case, it is preferable that the logical groupings correspond to real-world groupings that can be understood by an engineer or user that is tasked with formatting data (or tasked with creating a data formatter for formatting the data).

After creating one or more of the data objects, data corresponding to ones of the events is related to ones of the data objects (at step 104) and stored in the memory. During or after creation of the data objects, a number of data formatters (i.e., one or more data formatters) is provided access to the plurality of data objects and data in the memory. See step 106.

In one embodiment, the method 100 may include steps for formatting data. The steps include, for and via each of a number of active data formatters, accessing ones of the data objects and data stored in the memory (at step 108), formatting the data in accord with rules maintained by the data formatter (at step 110), and writing the formatted data to a file (at step 112). For purposes of this description, an "active" data formatter is one of a number of "available" data formatters that a user has selected to format a particular data set. If the method 100 is applied to circuit test, one or more of the data formatters may write data as a number of test records.

It is noted that the order of the method steps shown in FIG. 1 is not critical, and other orders of the steps, including parallel processing of the steps, is possible.

The method 100 shown in FIG. 1 may be implemented by means of computer readable code stored on computer readable media. The computer-readable media may include, for example, any number or mixture of fixed or removable media (such as one or more fixed disks, random access memories (RAMs), read-only memories (ROMs), or compact discs), at either a single location or distributed over a network. The computer readable code will typically comprise software, but could also comprise firmware or a programmed circuit.

Figure 2:
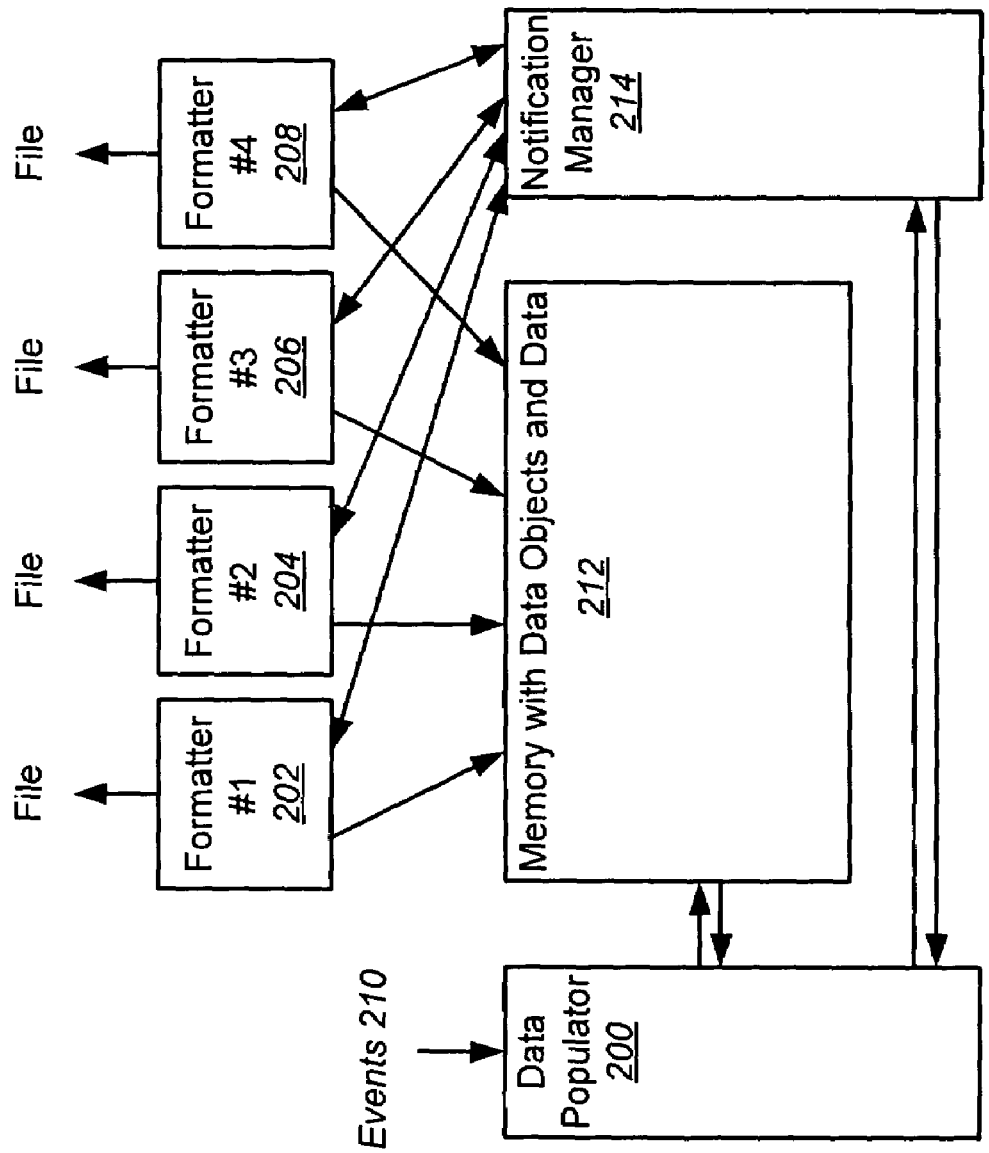
FIG. 2 illustrates various functional units (or processes) that may be instantiated or run as a result of executing the method shown in FIG. 1.

In one embodiment, the computer readable code that implements the method 100 may cause the functional units (or processes) shown in FIG. 2 to be instantiated or run. The functional units comprise a data populator 200 and a number of data formatters 202, 204, 206, 208 as well as many other optional components. However, it is noted that the boundaries between the various functional units are somewhat amorphous, and certain functions that are described below could alternately be performed by different ones of the functional units, or the functions of two or more units could be combined into a single functional unit (or process).

The data populator 200 1) receives a plurality of events 210, 2) creates a plurality of data objects in memory 212, 3) relates data corresponding to ones of the events to ones of the data objects, and 4) stores the data in the memory 212. At least some of the data objects created by the data populator 200 correspond to logical groupings of data that are implied by ones of the events received by the data populator 200. For purposes of this disclosure, "implied" groupings include those that are specifically "expressed".

The number of data formatters 202, 204, 206, 208 access ones of the data objects, and then retrieve and format the data that is related to the data objects.

In one embodiment, computer readable code may further instantiate or run a notification manager 214. The notification manager 214 may receive indications of events from the data populator 200, and in response to these indications, may provide notifications of ones of the events to one or more of the data formatters 202, 204, 206, 208. The data formatters 202, 204, 206, 208 may then be configured to initiate their access of data objects (and retrieval of data) in response to the notifications. Note that, in some cases, the indications of events received by the notification manager 214 may correspond to fewer or different events than those that are received by the data populator 200. For example, in the case of circuit test, the data populator 200 may receive indications of test setup events that are not deemed sufficiently important to pass to the notification manager 214, and that are not used as a basis for creating data objects. Also, there may be events that the data populator 200 infers from the events it receives. For example, based on a change in part numbers or other indicia, the data populator 200 might infer that a new "lot" of devices is being tested, and then provide an indication of such event to the notification manager 214 (i.e., even though the data populator 200 itself might not receive a new "lot" event).

The method 100 and apparatus disclosed above can be used in many applications, one being the storing and formatting of test results such as circuit test results. In one particular application, the test results may be generated by a 93000 SOC Series tester offered by Agilent Technologies, Inc.

The 93000 SOC Series tester (hereinafter referred to as the "93000 tester") is an SOC (System On a Chip) tester that logs test results and events to a binary data file known as an EDL (Event Data Logging) file. The events in this EDL file correspond to the execution of a plurality of tests on at least one device under test (DUT), and are stored in an ordered sequence. However, the events stored in the EDL file are not "thrown" to any other process, and are merely logged to the EDL file. In such an application, the method 100 shown in FIG. 1 may further comprise the steps 114, 116 of 1) parsing a data file corresponding to a plurality of events (e.g., an EDL file), to retrieve the plurality of events, and then 2) passing the events retrieved from the data file to a process (e.g., the data populator 200 shown in FIG. 2) that creates the plurality of data objects and stores data in memory 212.

Figure 3:
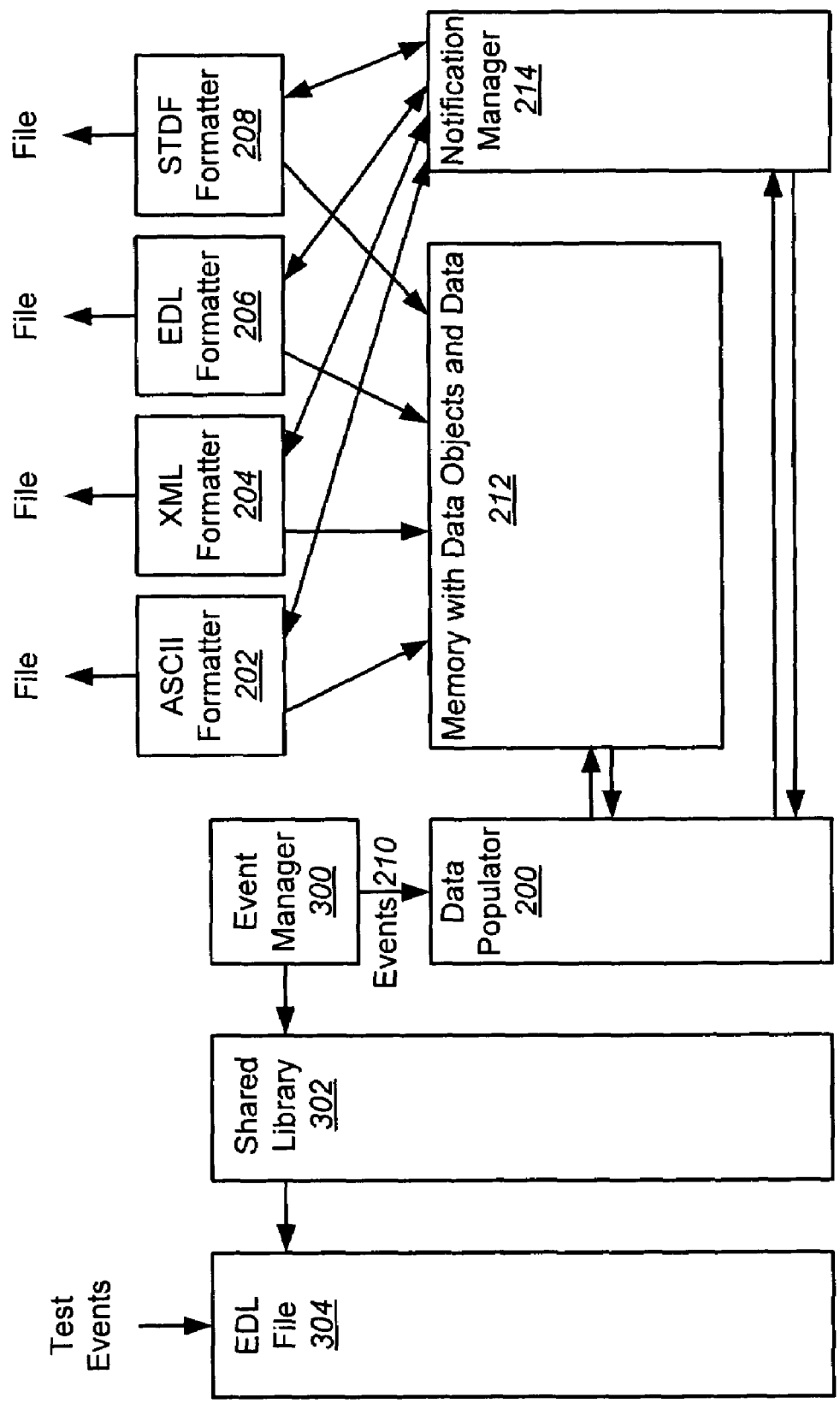
FIG. 3 illustrates a variation of the system shown in FIG. 2, the system being particularly suited for use in a test environment.

In one embodiment, the EDL file is parsed in response to method calls made by an event manager. As shown in FIG. 3, the event manager 300 may make method calls (e.g., get event; get event attribute) to a shared library 302, and the shared library 302 may then retrieve events from the EDL file 304 and "throw" them to the event manager 300. The event manager 300 then passes the events to the data populator 200.

The shared library 302 may take the form of compiled code, such as a data retrieval library (DRL), that executes a method or methods when called by the event manager 300.

The data objects that are created in memory 212 may be related to one another in various ways. However, in one embodiment, they are related to one another in a hierarchical tree structure. Data objects that are children of other data objects may maintain pointers to their parent data objects, but parent objects need not maintain a list of pointers to all of their children. As will be explained later in this description, these pointers from children to their parents can aid the process of deleting data objects that are no longer needed.

In the case of data objects that are based on the execution of a plurality of circuit tests, the logical groupings of data (e.g., groupings of test results) that are implied by the events may comprise one or more hardware groupings, such as groupings for lots, wafers and DUTs, and one or more test groupings, such as groupings of test results corresponding to tests and subtests.

Data may be related to data objects in various ways, including, by 1) directly storing data within the data objects, or 2) storing data in data structures that are related to the data objects (e.g., related by pointers or other means).

In an EDL file 304, data is stored as attributes of events. Thus, if the data populator 200 receives events drawn from an EDL file 304, the data populator 200 may extract data corresponding to events by extracting the data from attributes of the events. In the case of circuit test, the extracted data may comprise test results.

Figure 5:
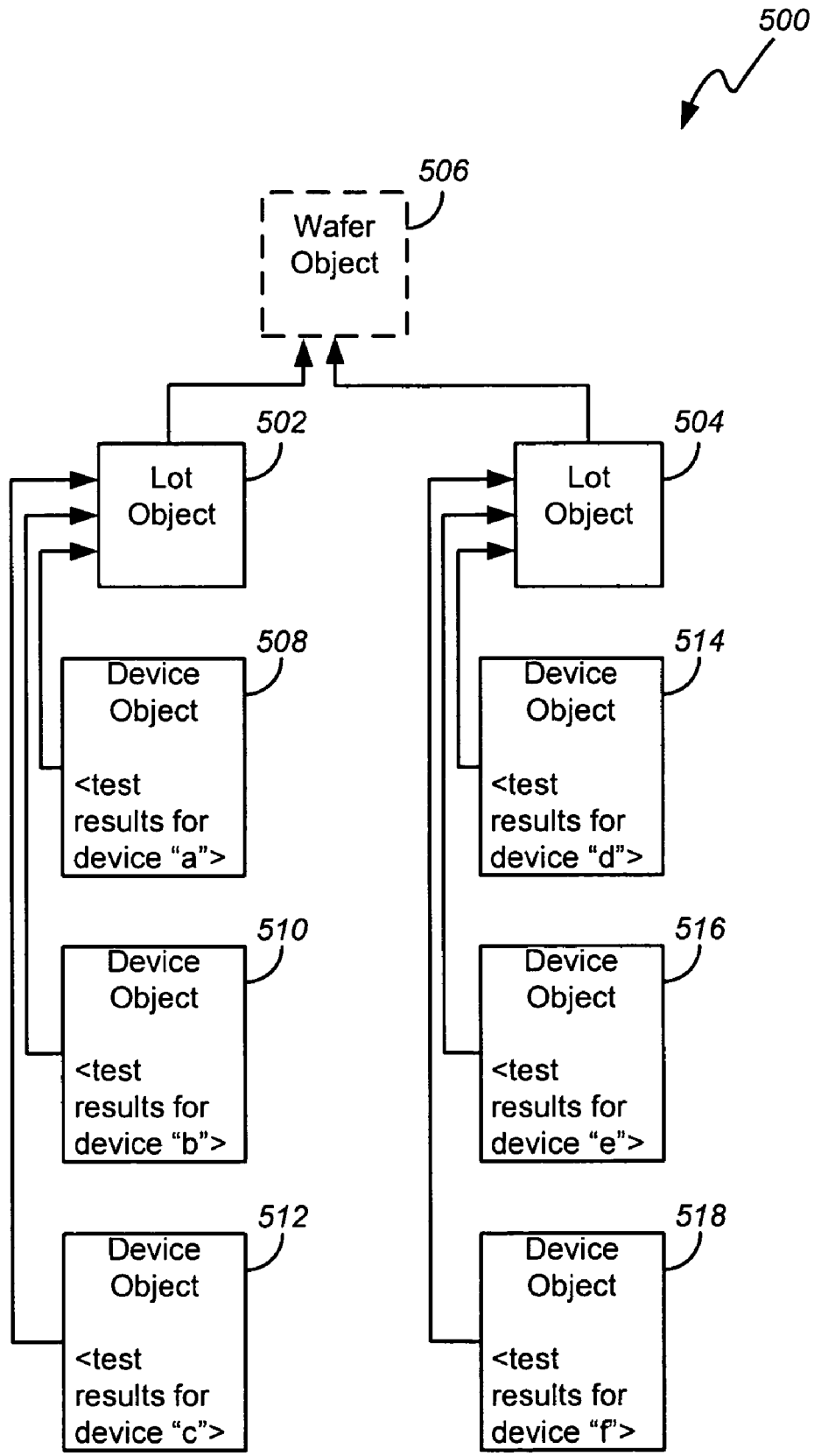
FIG. 5 illustrates an exemplary hierarchical tree structures for storing the contents of the EDL file shown in FIG. 4.

By way of example, FIG. 4 illustrates an exemplary embodiment of the contents of the EDL file 304, where some of the data associated with logged events comprises tests results. FIG. 5 illustrates an exemplary hierarchical tree structure 500 that the data populator 200 might create from the contents of the EDL file 304 shown in FIG. 4. The tree structure 500 comprises two lot objects 502, 504 (each of which may maintain a pointer to a parent "wafer object" 506) and six device objects 508, 510, 512, 514, 516, 518 (each of which maintains a pointer to a respective one of the lot objects 502, 504). As shown, available test results are associated with each of the device objects 508, 510, 512, 514, 516, 518.

In addition to storing individual data items in the memory 212, the data populator 200 may accumulate data statistics, such as test data statistics, and then relate the data statistics to ones of the data objects (e.g., by storing the data statistics within the data objects, or by storing the data statistics in data structures that are related to the data objects). In one embodiment, the data statistics may be accumulated by the data populator 200 and then related to a data object when fully compiled. In an alternate embodiment, incomplete data statistics may be related to data objects and then updated. Similarly to data statistics, the data populator 200 may accumulate data interpretations, such as test data interpolations, and relate them to ones of the data objects.

The choice of whether to have the data populator 200 or individual data formatters 202, 204, 206, 208 compile statistics and/or interpret data may be based on the usefulness of the statistic or interpretation in different data formats. That is, if a statistic or interpretation is likely to be needed by multiple data formatters 202, 204, 206, 208, it is often best to have the statistic or interpretation compiled once by the data populator 200. On the other hand, statistics and interpretations that are format-specific may best be compiled by a particular one of the data formatters 202, 204, 206, 208.

There are many ways in which the data formatters 202, 204, 206, 208 may access the data objects and data that are created by the data populator 200. In one embodiment, the data formatters 202, 204, 206, 208 can simply monitor the data objects. However, this can require a lot of memory bandwidth, and is often not very efficient. In a preferred embodiment, the data populator 200 generates pointers to the data objects that it creates, and then passes the pointers to the notification manager 214. The notification manager 214 then distributes ones of the pointers to ones of the data formatters 202, 204, 206, 208.

It is noted that that the notification manager 214 need only receive one pointer to each data object. The notification manager 214 can then replicate the pointer, or broadcast it, to each of the data formatters 202, 204, 206, 208. Alternately, the notification manager 214 may not replicate or broadcast the pointer for/to each of the data formatters 202, 204, 206, 208, and may only replicate or broadcast the pointer for/to certain ones of the data formatters 202, 204, 206, 208 that have subscribed for a type of data that is represented by the data object.

Typically, the operation of the data populator 200 will be given priority over the operation of the data formatters 202, 204, 206, 208. To further control access to the memory 212 in which the data objects and data are stored, the data populator 200 (or other process that creates the plurality of data objects and stores data in the memory 212) may be provided with direct access to the data objects and the data. However, the number of data formatters 202, 204, 206, 208 may be provided with access to the plurality of data objects via a structured interface that coordinates/arbitrates the data formatters' access to the data objects and data.

To reduce the number of data objects that is maintained in the memory 212, the data populator 200 may monitor reservations of the data objects, and may delete data objects that are no longer reserved by any object or process that references or accesses the data objects. In one embodiment, a data object is considered reserved when a pointer is generated to reference the data object. The data populator 200 may generate one such pointer upon creation of the data object, and the notification manager 214 may generate and distribute additional copies of this pointer to the data formatters 202, 204, 206, 208. The data populator 200 may also generate a pointer to an object when a child object of the data object is created. As pointers are generated, a count of the number of pointers that reference a particular data object may be maintained (possibly within the data object itself). The data formatters 202, 204, 206, 208 and other processes can then be programmed to relinquish their pointer to a data object when they have finished accessing the data object, and the data populator 200 can delete the data object when all such pointers have been released. Due to child objects referencing their parents, a parent object cannot be deleted until all of its children are first deleted.

Figure 6:
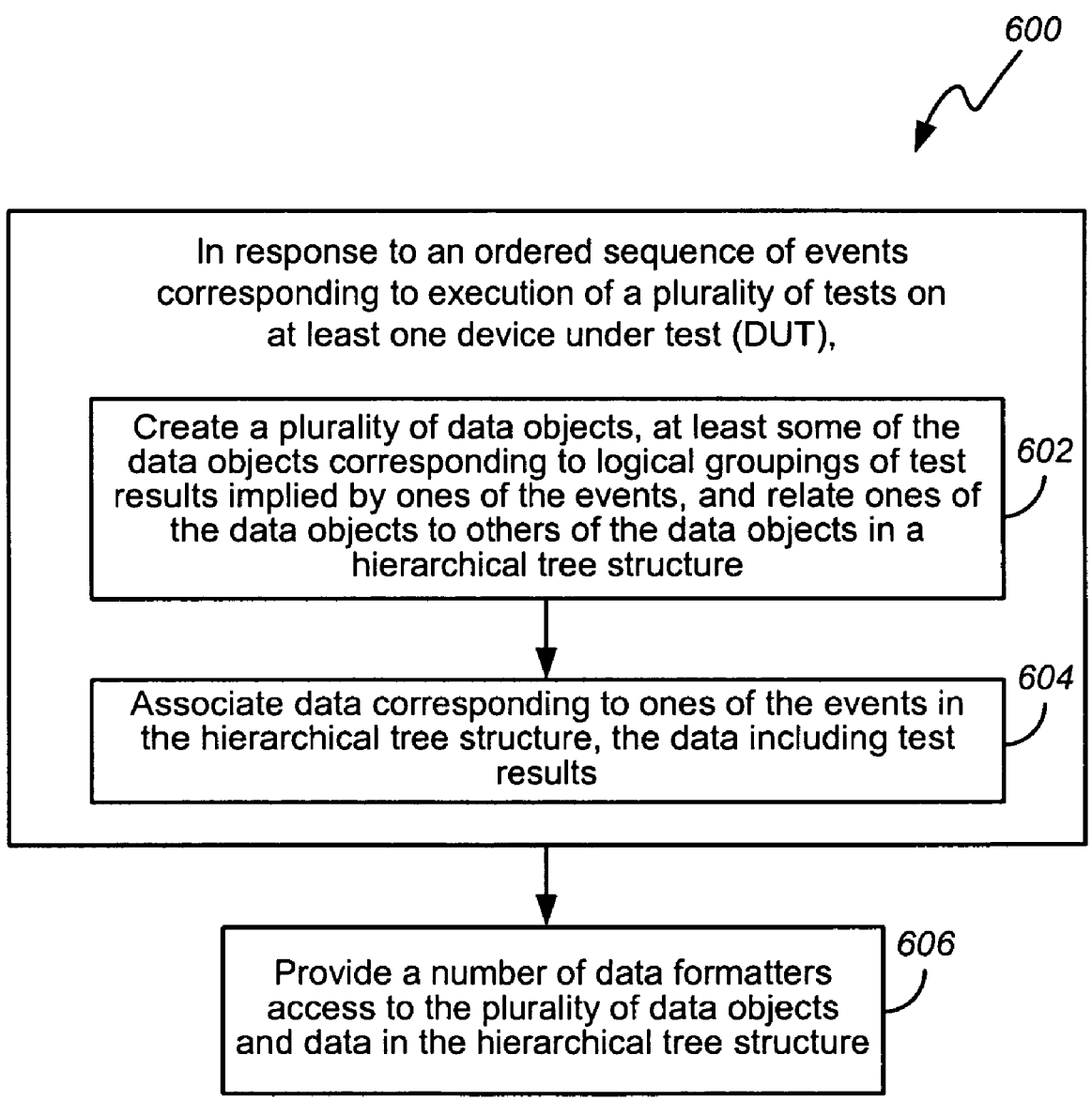
FIG. 6 illustrates a method that is similar to the method shown in FIG. 1, but which is particularly adapted for use in a test environment.

In light of the above teachings, FIG. 6 illustrates a method 600 that is in many ways similar to the method shown in FIG. 1, but which is particularly adapted for use in a test environment. The method 600 proceeds as follows. In response to an ordered sequence of events corresponding to execution of a plurality of tests on at least one DUT, a plurality of data objects are created, and are related to each other in a hierarchical tree structure, at step 602. At least some of the data objects correspond to logical groupings of test results that are implied by ones of the events (e.g., lots, wafers, DUTs, tests and/or subtests, to name a few). After creating one or more of the data objects, data corresponding to ones of the events, including test results, is related to ones of the data objects in the hierarchical tree structure at step 604. During or after creation of the data objects, a number of data formatters is provided access to the plurality of data objects and data in the hierarchical tree structure. See step 606.

The data formatters shown in FIG. 3 may take various forms, including forms such as an ASCII (American Standard Code for Information Interchange) formatter 202, an XML (eXtensible Markup Language) formatter 204, an EDL formatter 206 and/or an STDF (Standard Test Definition Format) formatter 208.

Although the hierarchical tree structure that is created by the method 600 is not required to be stored in memory 212, it is noted that is most always will be advantageous to do so, as this significantly speeds data creation/retrieval processes.

Depending on their implementation, the data models disclosed herein (i.e., where data objects are created based on logical groupings of data, and/or where data objects are related to one another in a hierarchical tree structure) can provide a number of advantages—especially in the context of circuit test. For example, by providing a separate process to organize data in memory, and then making the data available to a plurality of data formatters, much of the overhead of having to read and organize data is removed from the data formatters; and, by creating data objects "in memory", they can be accessed more quickly than data stored on disk. This enables the code of the data formatters to be lighter weight, and also provides a standard data model that can be leveraged by new data formatters. It also 1) enables easier revisions and patches to the data populator and individual data formatters, 2) enables parallel and faster coding of each of these functional units, and 3) reduces the likelihood of error in coding each functional unit (e.g., because each is lighter weight, and there is less code to test for each unit). Further, it enables a tester to generate data in a form that is more efficient to generate in a run-time test environment, while making test data available to data formatters (and the authors thereof) in a form that is more user-friendly and logically compartmentalized.

The data models disclosed herein, and the manner in which data is populated and removed from them, also help to balance 1) the speed with which a plurality of data formatters can format a common data set (i.e., they can each format the data of the data set in parallel), with 2) the real-world limitations on memory, storage and/or processing resources. In the realm of circuit test, and particularly when conducting parametric tests using an SOC tester, so much data is generated that resource limitations of even a well-provisioned computer system can be reached after testing as few as 10-20 chips. However, by using the data models disclosed herein, and removing data objects that are no longer needed, resource limitations can typically be avoided.

What is claimed is:

1. Apparatus, comprising:
    a data populator to i) receive a plurality of events, ii) create a plurality of data objects in memory, at least some of the data objects corresponding to logical groupings of data implied by ones of the events, iii) relate data corresponding to ones of the events to ones of the data objects, and iv) store the data in the memory;
    a number of data formatters to i) access ones of the data objects, and ii) retrieve and format the data that is related to the data objects, the data being retrieved in response to notifications received by the data formatter(s); and a notification manager to receive indications of events from the data populator and provide notifications of ones of the events to one or more of the data formatters.

2. The apparatus of claim 1, wherein the plurality of events received by the data populator is an ordered sequence of events.

3. The apparatus of claim 1, wherein the data populator relates ones of the data objects to others of the data objects in a hierarchical tree structure.

4. The apparatus of claim 1, wherein the data populator extracts data corresponding to ones of the events from attributes of the events.

5. The apparatus of claim 1, wherein:
the data populator generates pointers to the data objects it creates, and then passes the pointers to the notification manager; and
the notification manager receives the pointers and distributes ones of the pointers to ones of the number of data formatters.

6. The apparatus of claim 1, further comprising an event manager to i) make method calls to a shared library for the plurality of events, and ii) pass the plurality of events to the data populator.

7. The apparatus of claim 1, wherein the data populator further i) monitors reservations of the data objects stored in memory, and ii) deletes data objects that are no longer reserved by any object or process that references or accesses the data objects.

8. The apparatus of claim 1, further comprising a structured interface through which the number of data formatters access the data objects.

9. Apparatus for formatting test results, comprising:
a data populator to i) receive an ordered sequence of events corresponding to execution of a plurality of tests on at least one device under test (DUT), ii) create a plurality of data objects, with at least some of the data objects corresponding to logical groupings of test results implied by ones of the events, iii) relate ones of the data objects to others of the data objects in a hierarchical tree structure; and iv) store data corresponding to ones of the events in the hierarchical tree structure, the data including test results;

a number of data formatters to retrieve and format test results stored in the hierarchical tree structure, the test results being retrieved in response to notifications received by the data formatter(s); and a notification manager to receive indications of events from the data populator and provide notifications of ones of the events to one or more of the data formatters.

10. The apparatus for formatting test results of claim 9, wherein the hierarchical tree structure is stored in memory.

11. The apparatus for formatting test results of claim 9, wherein the data populator extracts data corresponding to ones of the events from attributes of the events, the extracted data including the test results.

12. The apparatus for formatting test results of claim 9, wherein:
the data populator generates pointers to the data objects it creates, and then passes the pointers to the notification manager; and
the notification manager receives the pointers and distributes ones of the pointers to ones of the number of data formatters.

13. The apparatus for formatting test results of claim 9, further comprising an event manager to i) make method calls to a shared library for next ones of the ordered sequence of events, and ii) pass the next ones of the ordered sequence of events to the data populator.

14. The apparatus for formatting test results of claim 9, wherein the data populator further i) monitors reservations of the data objects stored in the hierarchical tree structure, and ii) deletes data objects that are no longer reserved by any object or process that references or accesses the data objects.

15. The apparatus for formatting test results of claim 9, further comprising a structured interface through which the number of data formatters access the data objects.

* * * * *